(12) United States Patent
Ohashi et al.

(10) Patent No.: US 6,254,845 B1
(45) Date of Patent: *Jul. 3, 2001

(54) SYNTHESIS METHOD OF SPHERICAL HOLLOW ALUMINOSILICATE CLUSTER

(75) Inventors: Fumihiko Ohashi, Aichi; Shin-Ichiro Wada; Yasuko Kakuto, both of Fukuoka, all of (JP)

(73) Assignee: Agency of Industrial Science and Technology, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,819

(22) Filed: Feb. 11, 1998

(30) Foreign Application Priority Data

Feb. 25, 1997 (JP) .................................................. 9-058460

(51) Int. Cl.$^7$ ...................................................... C01B 33/26
(52) U.S. Cl. .................. 423/328.1; 423/326; 423/330.1; 502/263
(58) Field of Search .............................. 423/328.1, 330.1, 423/326, 329.1; 516/110; 502/263, 241, 242, 243, 246, 250, 254, 258

(56) References Cited

U.S. PATENT DOCUMENTS

| 4,217,240 | * | 8/1980 | Bergra | 423/328.1 |
| 4,252,779 |   | 2/1981 | Farmer | 423/327 |

FOREIGN PATENT DOCUMENTS 1 574954    3/1977   (GB) .

OTHER PUBLICATIONS

Wada, "Synthesis of Allophane and Imogolite—Reactions between Silicic Acid and Aluminum Ions in Dilute Aqueous Solutions", Nendo Kagaku, Feb. 25, 1985, pp. 53–60.

* cited by examiner

Primary Examiner—Stuart Hendrickson
(74) Attorney, Agent, or Firm—Oblon, Spivak, McClelland, Maier & Neustadt, P.C.

(57) ABSTRACT

The present invention provides a method for the homogenous and highly efficient synthesis of an aluminosilicate material that can be used for adsorbents, deodorants, catalyst carriers, humidity adjustors, and the like, and relates to a method for manufacturing spherical hollow silicate clusters, comprising steps of mixing a solution of a silicon compound and a solution of an aluminum compound or transition metal compound, each with a solution concentration of 10–1000 mmol, rapidly or simultaneously at a rate of 1–10,000 mL/min, removing a salt formed as a by-product, and then subjecting the mixture to hydrothermal synthesis to yield the silicate clusters.

9 Claims, 6 Drawing Sheets

30 nm

SYNTHESIS METHOD OF SPHERICAL HOLLOW ALUMINOSILICATE CLUSTER

DISCLOSURE OF THE INVENTION

The present invention relates to a novel method for manufacturing spherical hollow silicate clusters that can be used as adsorbents of hazardous substances; deodorants; catalyst carriers; humidity adjustors for automatically controlling the humidity of living rooms, car interiors, and other living environments; drug microcapsules; and other applications in which high specific surface is utilized and which have excellent water resistance, heat resistance, corrosion resistance, ion-exchange capacity, and adsorption capabilities.

BACKGROUND OF THE INVENTION

Nanometric fine particles are being studied in electronics, chemistry, machine metal industry, and other fields. Of particular interest for these industries are clusters representing aggregates of several thousand molecules, and superfine clusters comprising anywhere from several to several hundred atoms. The issue of controlling the synthesis, surface improvement, and fine structure of such nanometric fine particles occupies an important position in the aforementioned fields. There are, however, no reports on established methods for synthesizing hollow spherical particles of nanometric size capable of being used for microcapsules and the like.

Naturally occurring aluminosilicates shaped as hollow spheres are known as weathered volcanic glass, but precision techniques such as high-efficiency, high-purity separation/extraction have not yet been established for obtaining such fine particles, and additional research is being conducted.

An attempt has also been made to artificially synthesize amorphous aluminosilicate clusters shaped as such hollow spheres (Wada, S., Nendo Kagaku, Vol. 25, No. 2, pp. 53–60, 1985), but successful results can only be obtained when the starting material is a solution diluted to about 2–4 mmol, which is disadvantageous because the resulting yield is very low, the purity of the product is also low due to the formation of by-products, and the like. A synthesis method has also been proposed for raising the concentration of nanotubular silicates called imogolite to 60 mmol by making use of organosilicon and aluminum compounds (GB Patent 1,574,954 and U.S. Pat. No. 4,252,779), but there are no examples in which hollow spherical particles are synthesized in high concentrations.

The concentration of starting materials and the acidity or basicity of solutions must be taken into account in order to synthesize hollow spherical silicate clusters having such compositions or structures.

According to a conventional technique, a sodium hydroxide solution is added to a mixture of a monomer silicic acid compound solution (2 mmol or lower) and an aluminum compound solution (0.5–4 mmol) such that the NaOH/Al ratio is 3.0 in order to control the rate of polymerization, and the system is kept at 100° C. for about 5 days, yielding a hollow spherical silicate.

The aforementioned synthesis techniques are incapable of yielding such materials with high efficiency because of the conventional notion that amorphous silica or a hydroxide (boehmite, gypsite, or the like) precipitates first unless the starting materials are gradually mixed in a low concentration under near-equilibrium conditions, and the pH is slowly neutralized with an alkali.

SUMMARY OF THE INVENTION

The present invention provides a method for the homogenous and highly efficient synthesis of an aluminosilicate material that can be used for adsorbents, deodorants, catalyst carriers, humidity adjustors, and the like.

The present invention relates to a method for manufacturing spherical hollow silicate clusters, comprising steps of mixing a solution of a silicon compound and a solution of an aluminum compound or transition metal compound, each with a solution concentration of 10–1000 mmol, rapidly or simultaneously at a rate of 1–10,000 mL/min, removing a salt formed as a by-product, and then subjecting the mixture to hydrothermal synthesis to yield the silicate clusters.

DETAILED DESCRIPTION OF THE INVENTION

It is an object of the present invention to provide a method in which high-concentration starting materials are used to manufacture, with high efficiency, purity, and yield, homogeneous and highly pure hollow spherical silicate clusters that can be used as adsorbents of hazardous substances; deodorants; catalyst carriers; humidity adjustors for automatically controlling the humidity of living rooms, car interiors, and other living environments; drug microcapsules; and other applications having excellent water resistance, heat resistance, and corrosion resistance.

Aimed at attaining the stated object, the present invention resides in a method for producing spherical hollow silicate cluster characterized in the steps comprising of mixing a solution of a silicon compound and a solution of an aluminum compound or transition metal compound, each with a solution concentration of 10–1000 mmol, rapidly or simultaneously at a rate of 1-10,000 mL/min, removing a salt formed as a by-product, and then subjecting the mixture to hydrothermal synthesis to yield the silicate cluster.

In addition, the following methods are preferred embodiments of the present invention: a method for producing the aforementioned spherical hollow silicate cluster in which the composition of superfine particles shaped as hollow spheres and synthesized by using silicon compounds, aluminum compounds, or transition metal compounds as starting materials consists of one or more components selected from the group composed of silicates, aluminum, and transition metal elements; a method for producing the aforementioned spherical hollow silicate cluster in which the mean particle diameter of the spherical silicate particles constituting the clusters falls within a range of 1–10 nm, and the specific surface thereof, as measured by nitrogen adsorption, is $50m^2/g$ or greater; and a method for producing the aforementioned spherical hollow silicate cluster in which the silicon/aluminum or transition metal compound molar ratio is 0.5–5.0.

In the past, a solution of a silicate cluster and a solution of an aluminum compound or transition metal compound were slowly mixed in low concentrations. The present invention, however, adopts steps in which a solution of an alkali silicon compound and a solution of an aluminum compound or transition metal compound, each with a solution concentration of 10–1000 mmol, are mixed rapidly or simultaneously and a salt formed as a by-product is removed in order to (1) mix the silicon, aluminum, and transition metal compounds while neutralizing the system with the aid of the alkali silicon compound, and (2) use high-concentration starting solutions while preventing amorphous silica from precipitating by rapidly mixing these components. The corresponding silicon/aluminum or transition metal compound ratio should be about 0.5–5.0. The system is subsequently heated and aged, yielding a material in which the particle diameter is adjusted to 1–10 nm and in which the composition of the silicate material shaped as hollow spheres consists of one or more components selected from the group composed of aluminosilicates and transition metal elements.

In the present invention, silicon compounds, aluminum compounds, and transition metal compounds may be used in order to obtain a homogeneous silicate materials shaped as hollow spheres. Examples of reagents that can be used as silicon sources include sodium orthosilicate, alkyl orthosilicates, sodium metasilicate, and silicon dioxides in the form of amorphous colloids (such as aerogels and the like). These silicate compounds may be used individually or as combinations of two or more compounds.

Examples of inorganic compounds linked to the aforementioned silicate molecular aggregates in accordance with the present invention include aluminum chloride, sodium aluminate, aluminum hydroxide, and other aluminum compounds; organometallic compounds; and chloride, sulfide, hydroxide, nitrate, and other compounds of vanadium, iron, tungsten, titanium, cobalt, nickel, copper, zirconium, and other transition metals. These inorganic compounds may be used individually or as combinations of two or more compounds.

To obtain the proposed hollow spherical silicate clusters, a mixed solution of an aluminum compound or a compound of vanadium, iron, tungsten, titanium, cobalt, nickel, copper, zirconium, or another transition metal or other element with a concentration of 10–1000 mmol, and an aqueous solution of an alkali silicate compound with a concentration of 10–1000 mmol are mixed rapidly or simultaneously at a rate of 1–10,000 mL/min, yielding a precursor. The corresponding silicon/aluminum or transition metal compound ratio molar should be about 0.5–5.0. Boehmite or gypsite forms as a by-product when the molar ratio is below 0.5, and a large amount of noncrystalline silica forms as a by-product when the ratio exceeds 5.0.

When the precursor suspension has solution properties that are not neutral, it is effective to neutralize the system by adding hydrochloric acid, nitric acid, or sulfuric acid as an acid component after calculating its amount for the transition metal compound solution, or by adding sodium hydroxide, potassium hydroxide, calcium hydroxide, or the like as an alkali component after calculating its amount for the silicon compound solution. In this case, polyethylene glycol, polyvinyl alcohol, a surfactant, or other water-soluble or water-insoluble reagent may also be added as an anticoagulant.

The resulting precursor suspension is shaken for 1–24 hours at room temperature, and salts, which are the by-products of the reaction, are then removed. The removal method is not subject to any particular limitations and may involve ultrafiltration, separation in a centrifugal separator, or the like. Desalting is followed by the addition of purified water in the same amount as the amount removed, the system is aged for 3–5 days at 80–120° C. , and the resulting product is used to synthesize the hollow spherical silicate material of the present invention, either directly or after being washed several times with purified water and dried. The drying is accomplished at normal pressure and a temperature of 40–100° C. If an anticoagulant has been added, the component is extracted off for at last one hour at a temperature of 200° C. or lower with the aid of methanol, ethanol, acetone, toluene, xylene, benzene, or another organic solvent after the system has been dried, or a heat treatment is performed in air at 300–600° C. over a holding period of 1–8 hours, yielding the proposed hollow spherical silicate clusters.

The compound obtained by the above-described technique has a specific surface area of about 50–500 $m^2/g$ (as measured by a nitrogen adsorption technique), a mean particle diameter of 3–5 nm, and a mean pore diameter of 1–5 nm. An infrared absorption spectrum reveals a single absorption due to silicate compounds. Powder X-ray diffraction reveals two broad peaks close to 27° and 40°, which correspond to a noncrystalline structure. In addition, observations under a transmission electron microscope reveal a state in which hollow spherical particles with diameters of 3–5 nm are evenly distributed.

Thus, a noncrystalline aluminosilicate porous material shaped as hollow spheres can be obtained by a method in which an aqueous solution of a silicon compound and an aqueous solution of an aluminum or transition metal compound are mixed simultaneously at a high rate, reaction by-products are then removed, and the system is treated at its boiling point.

EXAMPLES

The present invention will now be described in further detail through examples and comparative examples.

Example 1

Sodium orthosilicate was dissolved in purified water, yielding 50 mL of a 100-mmol aqueous solution. In a separate operation, aluminum chloride was dissolved in purified water, yielding 67.15 mL of a 100-mmol aqueous solution. The aluminum chloride solution was mixed at a high rate with the aqueous solution of sodium orthosilicate, and the system was shaken for 1 hour at room temperature. The corresponding silicon/aluminum ratio was 0.75. After the shaking had been completed, the suspension was filtered using a membrane filter in order to remove the sodium chloride formed as a by-product. The precursor that had adhered to the filter was transferred into a conical flask, about 120 mL of purified water was then added, and the system was dispersed by ultrasonic waves for 1 hour. The dispersed suspension was aged for 5 days at 80° C., washed with purified water, and dried at normal temperature and pressure.

Figure 1:
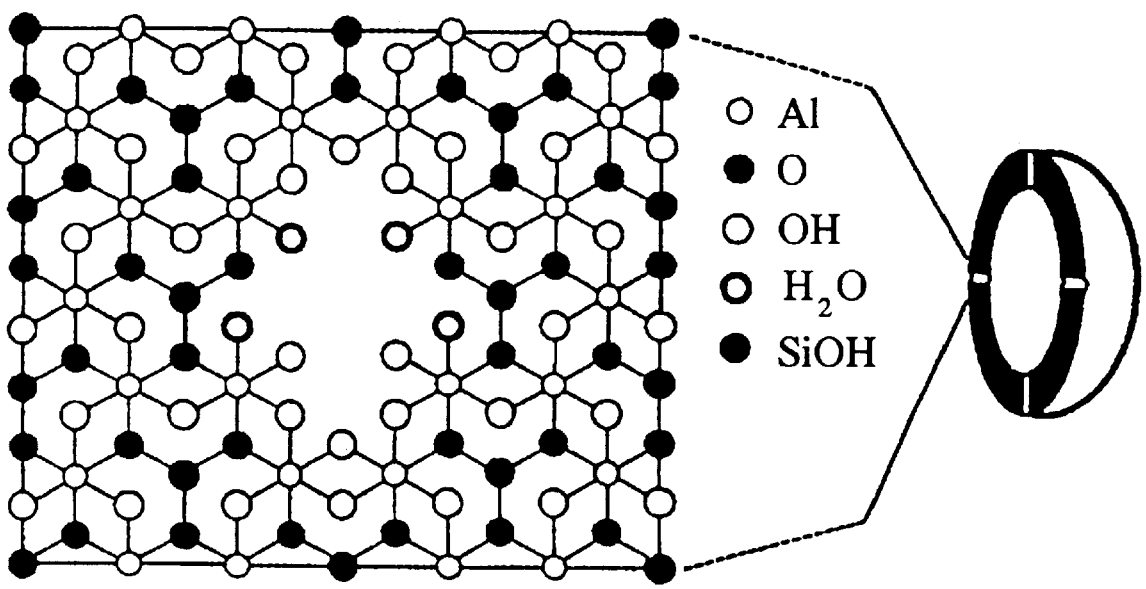
FIG. 1 is a schematic depicting the structure of a silicate cluster shaped as a hollow sphere.
Figure 2:
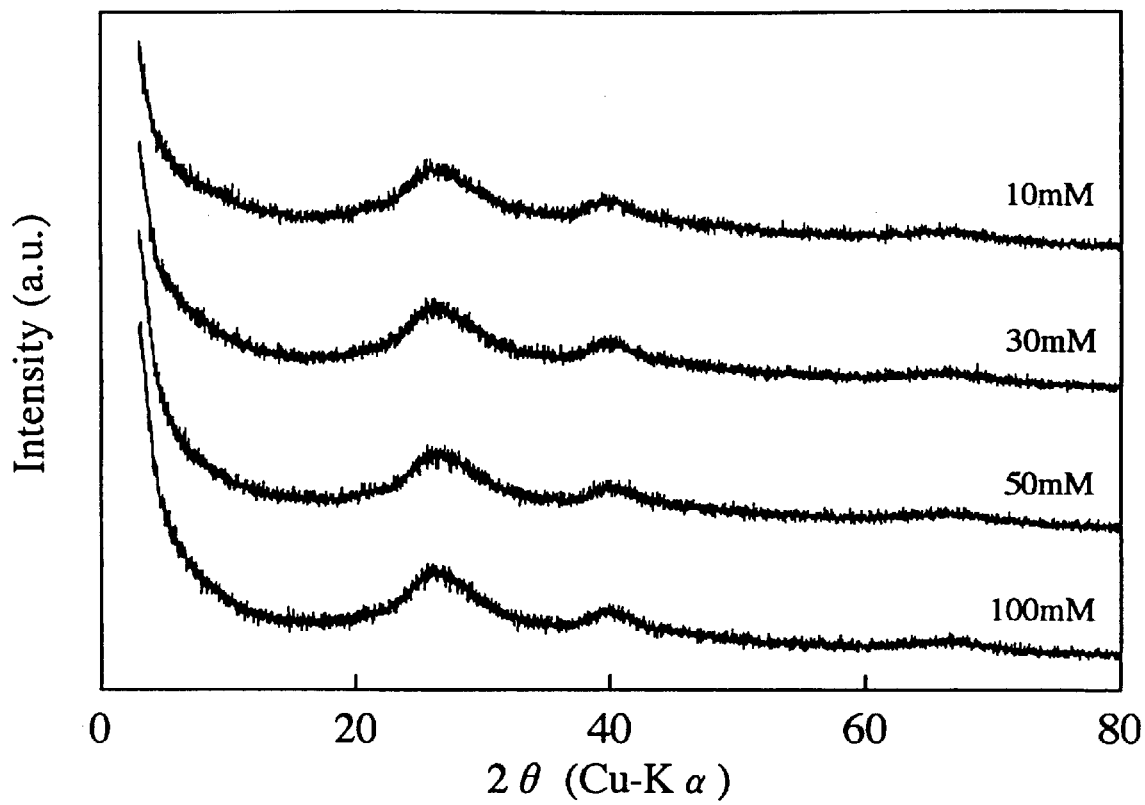
FIG. 2 is an X-ray diffraction pattern of a spherical hollow aluminosilicate cluster pertaining to an example of the present invention synthesized by varying the initial solution concentration.
Figure 3:
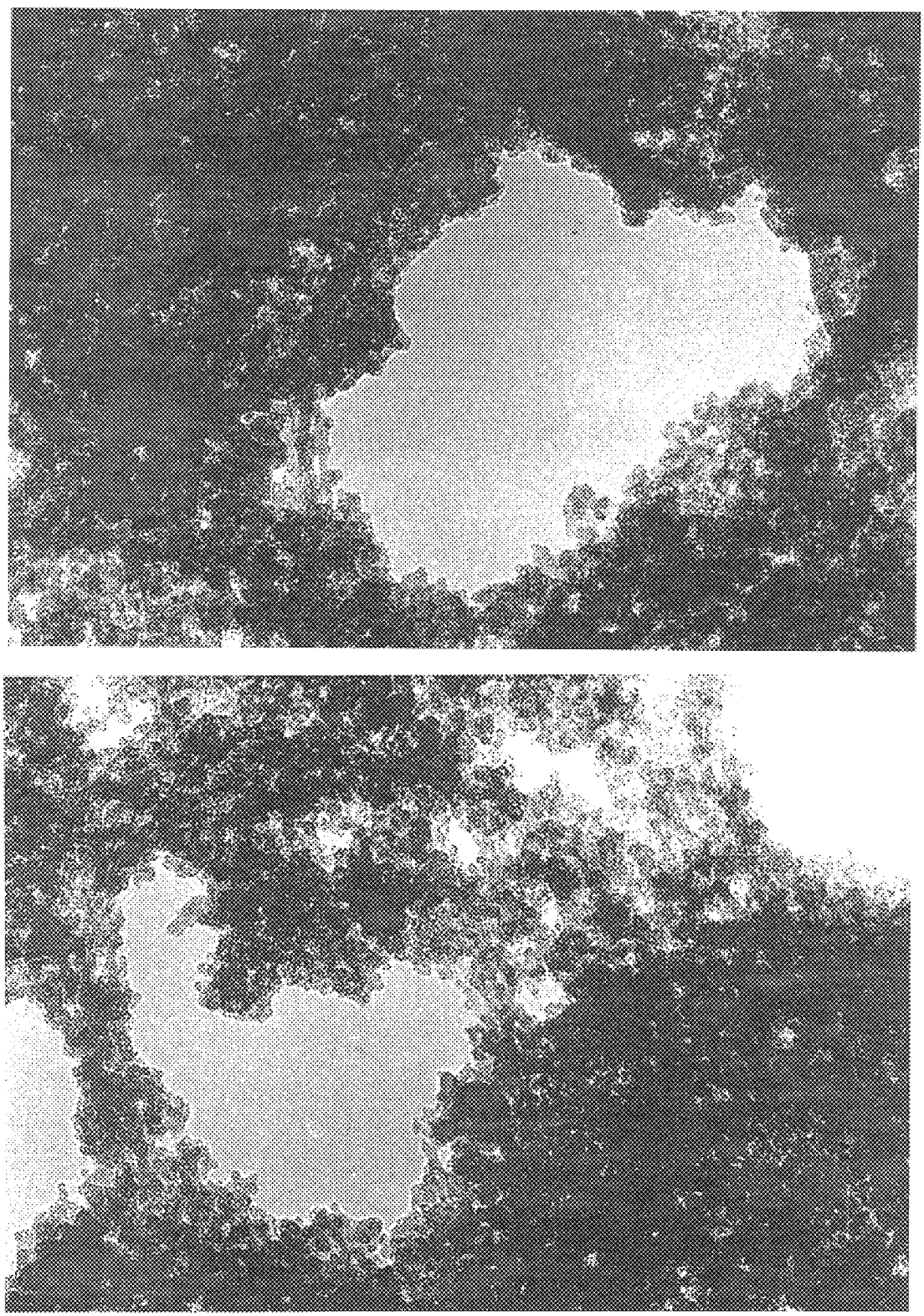
FIG. 3 is an electronic photomicrograph of a spherical hollow aluminosilicate cluster (particle structure) pertaining to an example of the present invention.
Figure 4:
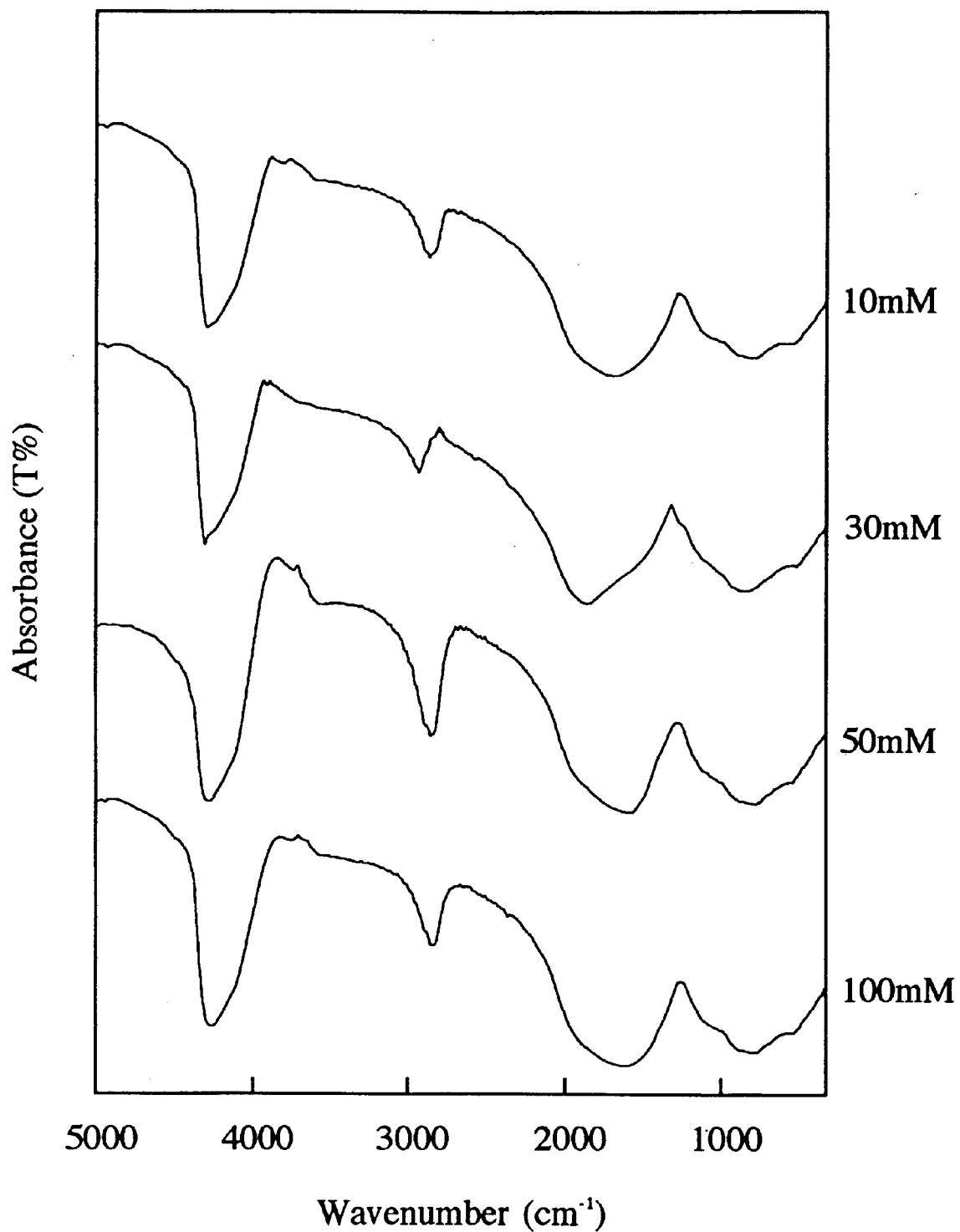
FIG. 4 is an infrared absorption spectrum of the spherical hollow aluminosilicate cluster pertaining to an example of the present invention.
Figure 5:
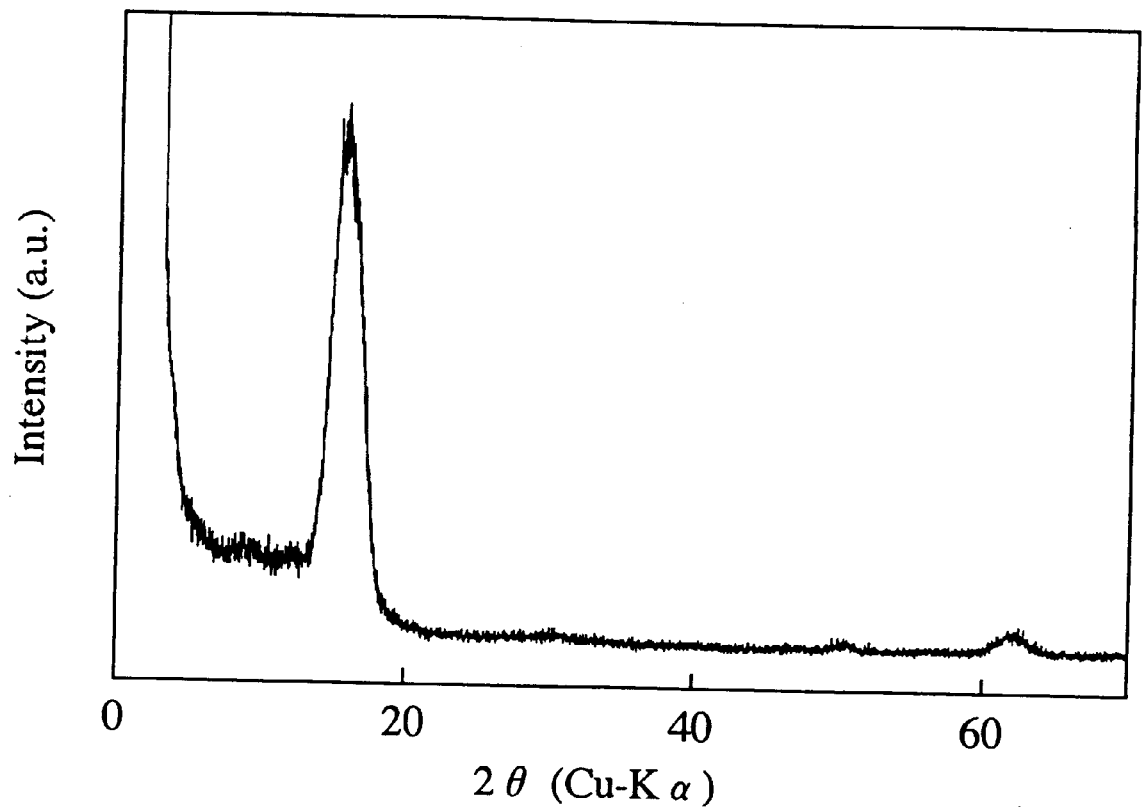
FIG. 5 is an X-ray diffraction pattern of a spherical hollow aluminosilicate cluster pertaining to Comparative Example 1.
Figure 6:
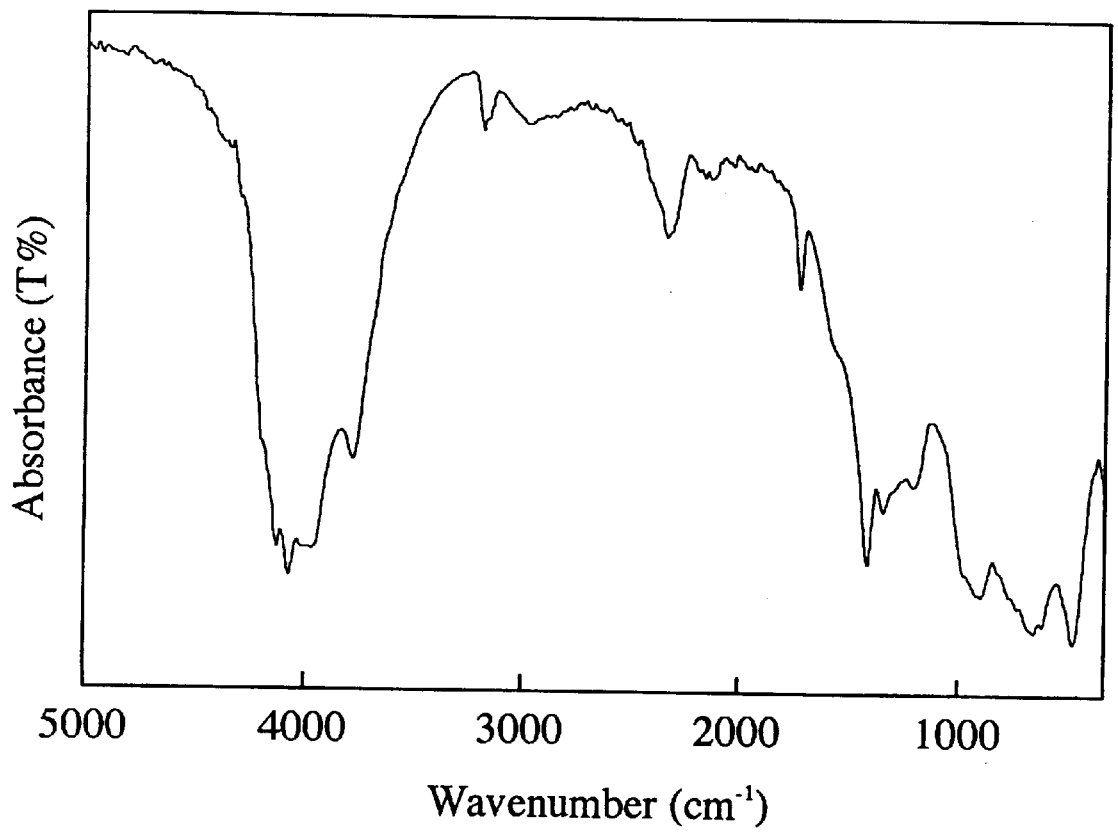
FIG. 6 is an infrared absorption spectrum of the spherical hollow aluminosilicate cluster pertaining to Comparative Example 1.

It follows from the X-ray diffraction pattern in FIG. 2 that the spherical hollow aluminosilicate cluster thus obtained has broad peaks near $2\theta=25-26°$ and near $38-42°$ on the Cu-$K_\alpha$ line, which is characteristic of spherical particles referred to as allophane.

The fact that the product was hollow and spherical and had a diameter of 3–5 nm was also confirmed based on the results of observations under an electronic microscope. In addition, an infrared absorption spectrum revealed only an absorption due to aluminosilicates. The specific surface was about 500 $m^2/g$ (as measured by nitrogen adsorption), and the mean pore diameter was about 3 nm. The yield was 90% or higher, and the purity was nearly 100%, irrespective of the type of compound formed as a by-product.

Example 2

A 50-mmol aqueous solution (25 mL) and a 100-mmol aqueous solution of sodium hydroxide (26.82 mL) were prepared and mixed. In a separate operation, 84.15 mL of an aqueous solution of aluminum chloride (50 mmol) was prepared and quickly added to the aforementioned mixed solution. The corresponding silicon/aluminum ratio was 0.6. The product was thoroughly agitated at room temperature, and the resultant sodium chloride by-product was then removed by a technique involving the removal of a supernatant by centrifugation. The reaction precursor was recovered, 130 mL of purified water was added, and a reaction was then conducted for 5 days at 80° C.

It was learned based on a morphological study of spherical particles under an electron microscope, on broad peaks and other peaks obtained by X-ray diffraction and ascribed to noncrystalline substances, and on Si-OH, Si-O-Si(Al), and other broad adsorption bands obtained by infrared absorption spectroscopy and ascribed to aluminosilicates that the reagent that had been dried in a 50° C. electric drier was an aggregate of hollow spherical particles with diameters of 4–5 nm and that this aggregate had a specific surface area of about 500 $m^2/g$ (as measured by nitrogen adsorption) and a mean pore diameter of 5 nm, and formed an aluminosilicate cluster. The yield was about 95%, and the purity was about 100%.

Similar results were obtained by performing the same procedures using other silicon compounds, aluminum compounds, or transition metal compounds.

Comparative Example 1

An ethanol solution of ethyl orthosilicate was diluted with purified water such that the silicon concentration was 2 mmol, yielding a total of 4000 mL of aqueous solutions (1000 mL each). Aqueous solutions of aluminum chloride (0.5, 1.0, 2.0, and 4.0 mmol) were prepared in an amount of 1000 mL each, and these solutions were mixed with the above, yielding 2000 mL in each case. An aqueous solution of sodium hydroxide (1000 mmol) was then slowly added at a rate of 0.5 mL/min under agitation such that the sodium hydroxide/aluminum ratio was 3.0. A saturated aqueous solution of sodium chloride was added in order to aggregate and precipitate the resulting aluminosilicate.

After the aggregation had been completed, the final product was washed with purified water, dried at room temperature, and submitted to various measurements.

X-ray diffraction revealed that, of the samples obtained, the product in which 4 mmol of the aqueous solution of aluminum chloride was used had a peak that could be ascribed to boehmite, which is an aluminum compound, and it was evident that the product had an inhomogeneous phase. The formation of boehmite was also confirmed by the results of infrared absorption spectroscopy.

As described in detail above, conventional synthesis techniques are incapable of yielding nanometric hollow spherical particles with high efficiency and in a high concentration, whereas the present invention allows high-purity, homogeneous spherical hollow silicate clusters to be manufactured with high efficiency, purity, and yield by using high-concentration starting materials. The spherical hollow silicate clusters prepared by the new synthesis method of the present invention have the excellent water resistance, heat resistance, and corrosion resistance of inorganic compounds and can thus be used as adsorbents of hazardous substances; detergents; deodorants; catalyst carriers; humidity adjustors for automatically controlling the humidity of living rooms, car interiors, and other living environments; drug microcapsules utilizing the irregular shape thereof; and a wide variety of other commercial applications.

What is clamed is:

1. A method for producing hollow silicate clusters, the method comprising mixing at a rate of 1–10,000 mL/min a 10–1000 millimolar solution of a silicon compound and a 10–1000 millimolar solution of an aluminum compound or a transition metal compound to form a suspension including a salt in solution and precursor particles;

removing at least a portion of the salt in solution from the precursor particles; and then subjecting the precursor particles to hydrothermal synthesis to yield the hollow silicate clusters, wherein each of the hollow silicate clusters comprises hollow silicate particles; and each of the hollow silicate particles comprises a silicate. and aluminum or a transition metal element.

2. The method as defined in claim 1, wherein the hollow silicate particles form at least one pore in the hollow silicate clusters; and the mean pore diameter of the at least one pore is in a range of from 1–5 nm.

3. The method as defined in claim 1, wherein the mean particle diameter of the hollow silicate particles is from 1–10 nm; and the specific surface area of the hollow silicate particles, as measured by nitrogen adsorption, is 50 $m^2/g$ or greater.

4. The method as defined in claim 1, wherein a molar ratio of the silicon compound to the aluminum compound or the transition metal compound is 0.5–5.0.

5. The method as defined in claim 1, wherein the solution of a silicon compound is an aqueous solution.

6. The method as defined in claim 1, wherein the solution of an aluminum compound or a transition metal compound is an aqueous solution.

7. The method as defined in claim 1, wherein the hydrothermal synthesis comprises heating the precursor particles in an aqueous suspension at a boiling point of the aqueous suspension.

8. The method as defined in claim 7, wherein the boiling point of the aqueous suspension is from 80° C.–120° C.

9. The method as defined in claim 1, wherein each of the hollow silicate clusters comprises an empty core larger than each of the hollow silicate particles.

* * * * *

UNITED STATES PATENT AND TRADEMARK OFFICE
CERTIFICATE OF CORRECTION

PATENT NO.     : 6,254,845 B1
DATED          : July 3, 2001
INVENTOR(S)    : Ohashi et al.

It is certified that error appears in the above-identified patent and that said Letters Patent is hereby corrected as shown below:

<u>Title page,</u>
Item [75], the inventor's information should read:

-- (75) Inventors:  Fumihiko Ohashi, Nagoya; Shin-Ichiro Wada, Ogoori; Yasuko Kakuto, Fukuoka, all of (JP) --;
-- (73) Assignee:  Japan as represented by Director General of Agency of Industrial Science and Technology, Tokyo (JP) --

Signed and Sealed this

Eleventh Day of June, 2002

Attest:

JAMES E. ROGAN
*Attesting Officer*     *Director of the United States Patent and Trademark Office*